United States Patent Office 3,338,334
Patented Aug. 29, 1967

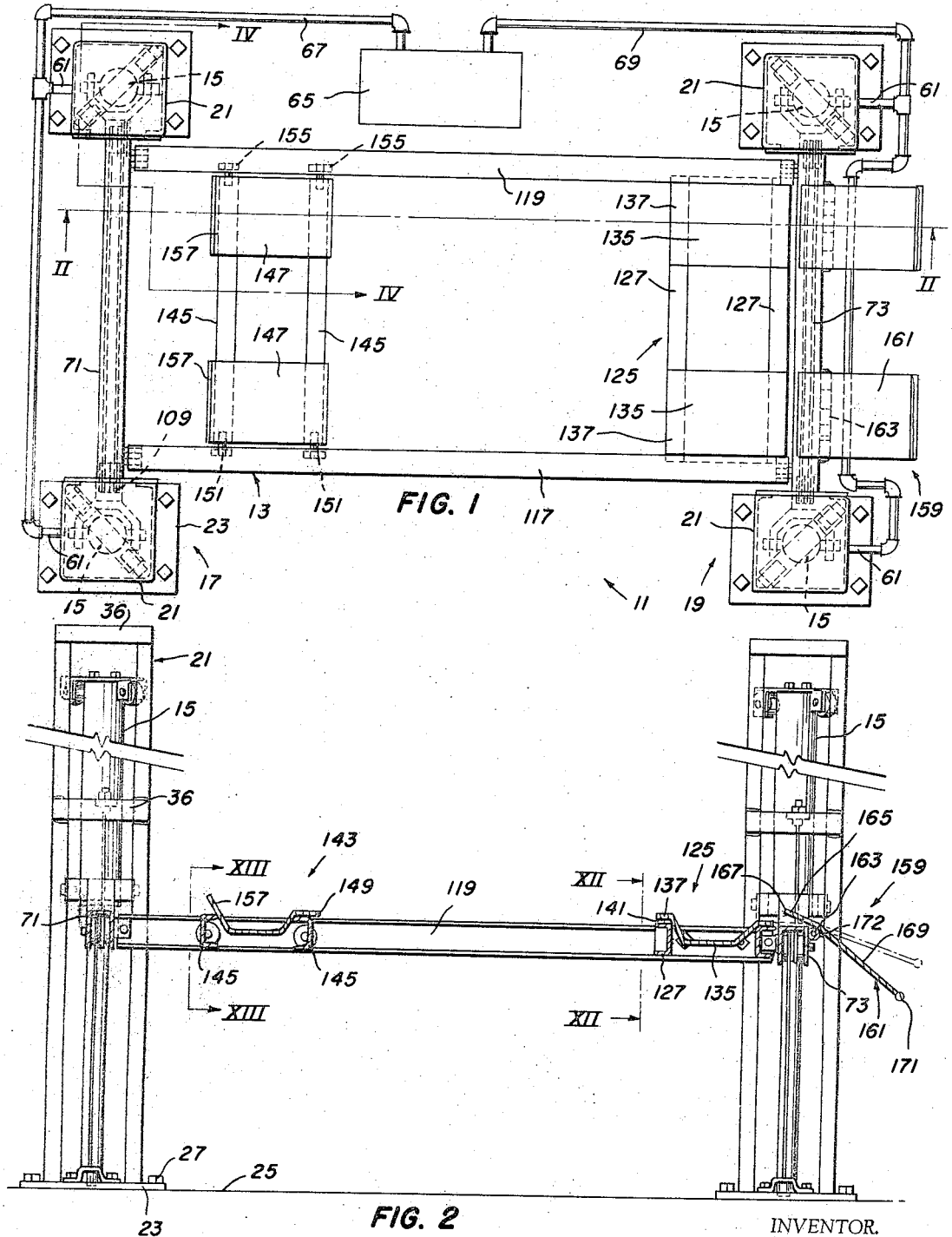

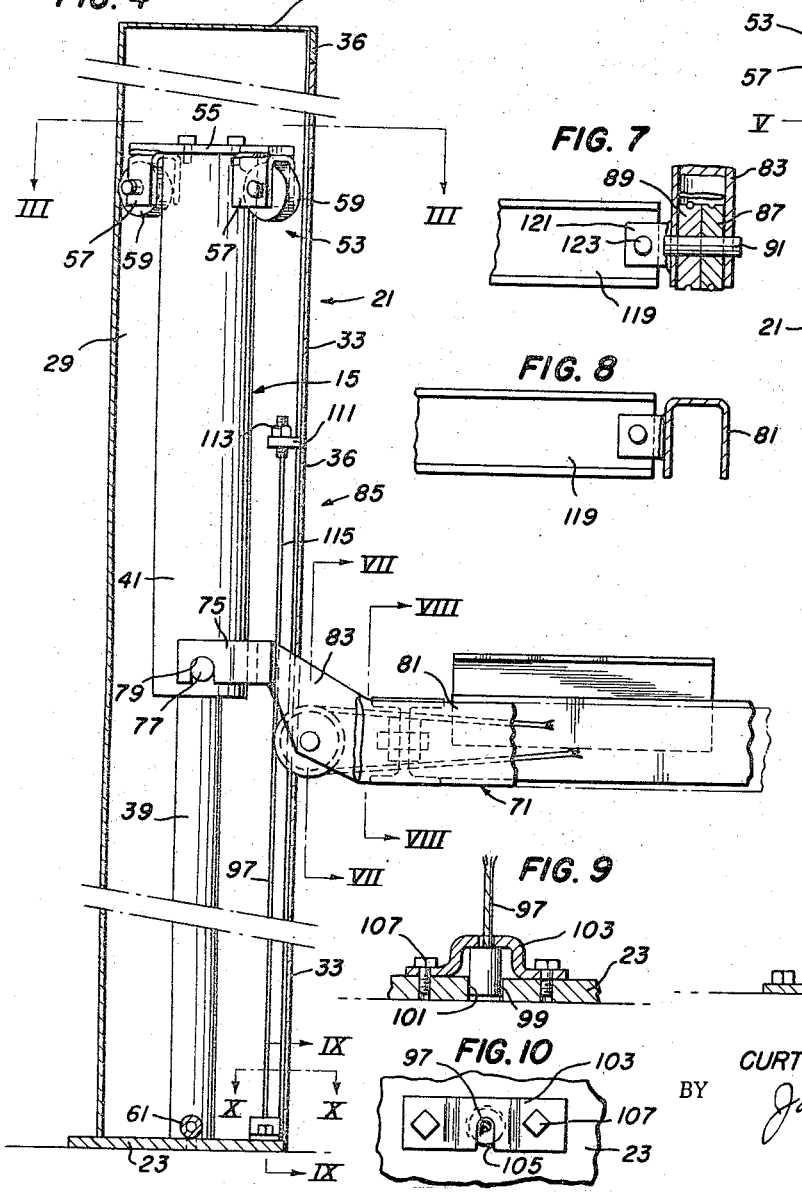

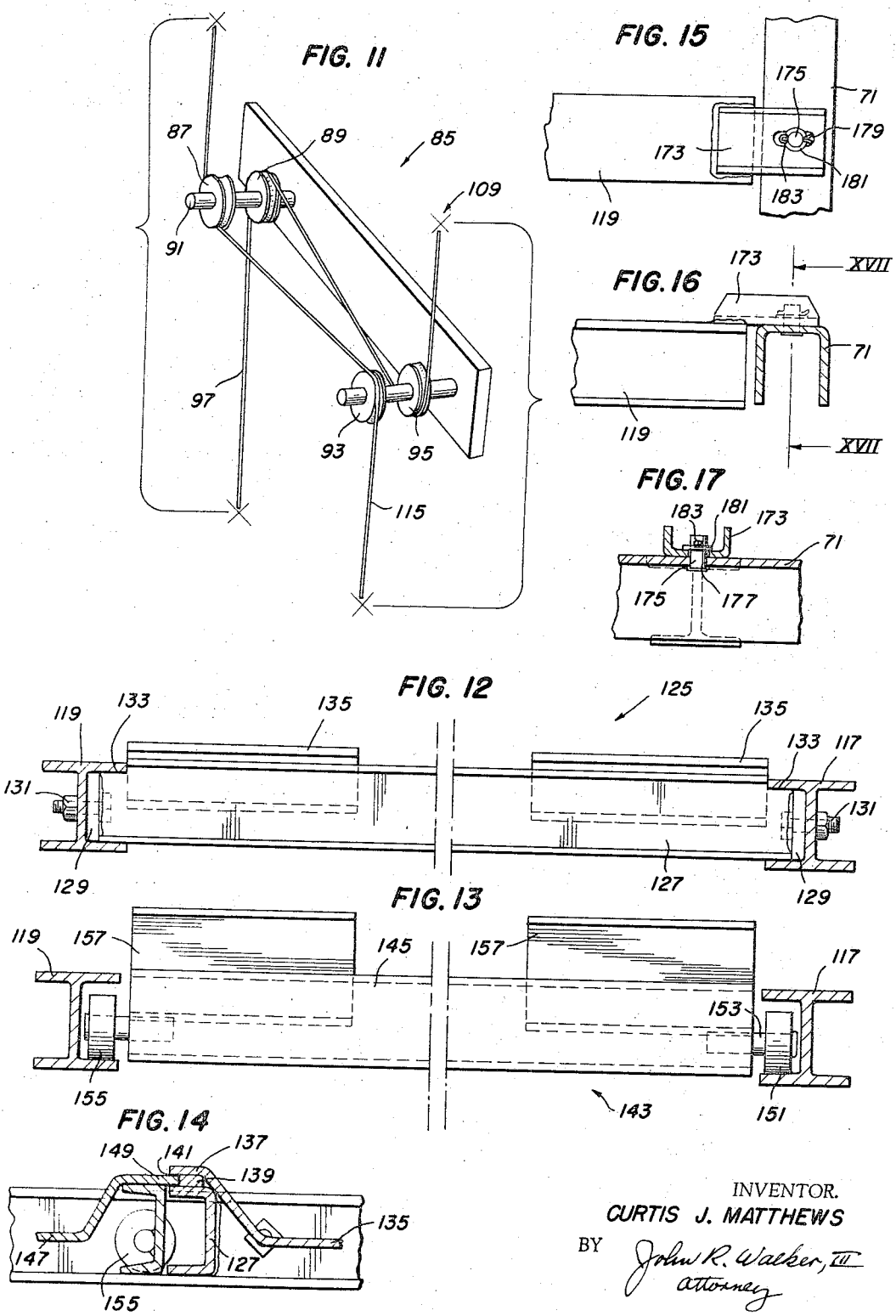

1

3,338,334
VEHICLE LIFT
Curtis J. Matthews, Memphis, Tenn., assignor to
Dover Corporation, Washington, D.C.
Filed Mar. 24, 1965, Ser. No. 442,461
2 Claims. (Cl. 187—8.59)

This invention relates to a vehicle lift and, more particularly, relates to a vehicle lift of the type having four upstanding jacks that movably support a vehicle supporting carriage especially adapted for elevating an automotive vehicle so that access is provided to the under portions thereof for lubrication and repairs.

In prior devices of the above-mentioned type, there have been a number of problems existing, and among which are the following: In the typical prior devices, the vehicle supporting carriage was fixedly mounted on the four jacks, and the jacks were arranged to simultaneously raise and lower. If the jacks did not raise and lower precisely together, it would cause binding of the vehicle supporting carriage. In an attempt to solve this problem, various means for equalizing or tying in the four jacks with one another have heretofore been contemplated, so that the jacks would be precisely synchronized in their raising and lowering movements. Also, there has been the problem of movable hydraulic lines extending to the plurality of jacks which moved up and down as the jacks were raised and lowered, and the problem of the height of the jack extension, particularly in low-ceiling service stations and the like.

The present invention is directed towards overcoming the above-mentioned and other problems of vehicle lifts of the heretofore mentioned type by providing, among other things, a unique arrangement of the vehicle-supporting carriage and jacks which includes, briefly, the provision of equalizing the jacks in pairs, that is, tying in together the front pair of jacks with each other and the rear pair of jacks with each other, but without tying in the front pair with the rear pair, and then pivotally mounting the longitudinal members of the carriage on the forward and rearward transverse members, which are respectively, in turn, attached to the forward and rearward pairs of jacks. With this arrangement, the vehicle lift can be lowered and raised without any binding of the carriage, and yet additional equalizing mechanisms between the front and rear jacks are eliminated. Also, the present invention further provides for the jacks to be inverted so that they are supported by the plungers with the hydraulic fluid being fed in through the centers of the plungers at the bottoms thereof. Also, there are provided in the present invention casings in which the jacks are housed, and stabilizing or bracing means reacting between the jack cylinders and the casings, which permit jacks with less overall extension height to be used.

Thus, one of the objects of the present invention is to provide, in a vehicle lift of the above-mentioned type, an improved arrangement of the vehicle supporting carriage and jacks so that a more economical and more efficient vehicle lift is possible.

A further object is to provide such an arrangement in which the jacks are inverted, and the hydraulic oil is brought in through the plungers so that movable hoses are eliminated.

A further object is to provide such an arrangement in which stabilizing or bracing means are provided between the jack cylinders and the casings surrounding the cylinders so that the overall height of the vehicle lift can be reduced and a more compact and economical construction is provided.

A further object is to provide a vehicle lift having a simple yet effective means for serving as a ramp and as a chock for the vehicle wheels.

A further object is to provide a vehicle lift of the above-mentioned type having an improved arrangement in which the movable front wheel supporting structure has a flange that is movable into nested or overlapping relationship with a forwardly extending flange on the rear wheel supporting structure to permit a safe and effective loading of the vehicle onto and off of the vehicle lift.

A further object is to provide a unique arrangement for mounting the jacks in the vehicle lift of the present invention so that if it becomes necessary to remove a jack for repair or the like, it can be done easily and quickly without having to remove bolts and the like.

A further object is generally to improve the design and construction of vehicle lifts.

The means by which the foregoing and other objects of the present invention are accomplished and the manner of their accomplishment will be readily understood from the following specification upon reference to the accompanying drawings, in which:

FIG. 1 is a plan view of the vehicle lift of the present invention and showing the hydraulic system somewhat diagrammatically.

FIG. 2 is a sectional view taken as on the line II—II of FIG. 1 and with the cover place of the casings removed for purposes of illustration.

FIG. 3 is a fragmentary sectional view taken as on the line III—III of FIG. 4.

FIG. 4 is a fragmentary vertical sectional view of one of the jacks and its related structure, taken as on the line IV—IV of FIG. 1.

FIG. 5 is a fragmentary sectional view taken as on the line V—V of FIG. 6, and with parts shown in elevation for purposes of illustration.

FIG. 6 is a sectional view taken as on a vertical plane through one of the jacks.

FIG. 7 is a fragmentary sectional view taken as on the line VII—VII of FIG. 4.

FIG. 8 is a fragmentary sectional view taken as on the line VIII—VIII of FIG. 4.

FIG. 9 is a fragmentary sectional view taken as on the line IX—IX of FIG. 4.

FIG. 10 is a fragmentary sectional view taken as on the line X—X of FIG. 4.

FIG. 11 is a diagrammatic view of one of the equalizing means used in conjunction with the present invention.

FIG. 12 is a sectional view taken as on the line XII—XII of FIG. 2.

FIG. 13 is a sectional view taken as on the line XIII—XIII of FIG. 2.

FIG. 14 is an enlarged fragmentary view of a portion of that shown in FIG. 2, but with the vehicle wheel supporting structures being in a nested relationship.

FIG. 15 is a fragmentary plan view of a modified means for joining a longitudinal member and a transverse member in the vehicle supporting carriage of the present invention.

FIG. 16 is a fragmentary side view of the structure shown in FIG. 15.

FIG. 17 is a fragmentary sectional view taken as on the line XVII—XVII of FIG. 16.

Referring now to the drawings in which the various parts are indicated by numerals, the vehicle lift 11 of the present invention comprises, in general, a vehicle supporting carriage 13 supported for the raising and lowering thereof by four jacks 15 which are arranged in two pairs. Thus, a first or forward pair 17 of jacks 15 are spaced apart and support the forward end of carriage 13, and a second or rearward pair 19 of jacks 15 support the rearward end of carriage 13. Four casings 21 respectively house jacks 15. The casings 21 are substantially identical, and also the jacks 15 are substantially identical. Thus, the following description of one of the jacks 15 and its associated casing 21 will suffice for all:

Casing 21 includes a rectangular base plate 23 which is fixedly attached to the supporting surface 25, which may be the floor of the garage or other place where the vehicle lift 11 is installed, and the attachment means includes any suitable means such as bolts 27 or the like. Casing 21 additionally includes upstanding portion 29 that is preferably square in cross-section, as best seen in FIG. 3, and is made up of the three vertical walls 31, which may be formed from a single sheet of metal, and a fourth wall or removable covers 33 removably attached to two of the walls 31 by the flanges 35 and suitable bolts, not shown, to provide access to the interior of the hollow upstanding portion 29. Also, horizontal members 36 are fixedly attached to flanges 35 and span the space therebetween. Upstanding portion 29 is rigidly mounted to base plate 23 as by welding or the like and extends vertically therefrom. The upper end of upstanding portion 29 is preferably closed by a top 37 fixedly mounted to the upper end of walls 31.

An inverted jack 15 is received in casing 21, that is, the plunger 39 of the jack 15 is the stationarily mounted part, and the cylinder 41 of the jack 15 is the part that is arranged for vertical movement. More specifically, plunger 39 is provided adjacent its lower end with a depending protrusion 43 that fits into an aperture 45 in base plate 23 with the lower end of the plunger resting on the base plate.

It will be understood that, with this construction, it is easy to remove a jack for repair in the event it becomes necessary.

Cylinder 41 opens downwardly and telescopically receives plunger 39. Suitable packing 47 is provided in the lower end of cylinder 41 between the cylinder and the plunger. A single bearing 49 in cylinder 41 is all that is necessary, rather than having two bearings, and the reason for this will be understood better in the description to follow. The upper end of cylinder 41 is closed, as at 51, and diagonally fixedly mounted thereon is a roller carrier 53 of suitable construction that preferably includes a member 55 having depending forked portions 57 at the opposite ends thereof and in which are respectively mounted rollers 59 that rollingly engage a pair of the interior corners of upstanding portion 29 of casing 21. The rollers 59, as will be seen in FIG. 6, are positioned below the upper end of cylinder 41 so that the cylinder can travel to a position almost to the top 37, whereby the height of casing 21 can be kept to a minimum. It will be understood that, as the cylinder 41 is raised and lowered, the rollers 59 will roll along the opposite corners of upstanding portion 29 and will stabilize or brace the cylinder so that only one bearing is needed in the cylinder. Also, this permits a greater extension of the plunger 39 from the cylinder 41, and, therefore, an overall reduction in the height of the jack 15 can be provided. In other words, if it were necessary to have two bearings, it would be necessary for a greater length of the plunger to remain in the cylinder when the jack is at its fully extended position, which would mean that a longer plunger would be necessary, which, in turn, means that in order to fully receive the plunger in the cylinder when the cylinder is in a fully lowered position, it would be necessary consequentially to have a longer cylinder.

The hydraulic fluid is brought into the jack 15 through a line 61 that enters the plunger adjacent the lower end thereof, as best seen in FIG. 6, and communicates with a central opening 63 in plunger 39, which opening extends through the upper end of the plunger and into the interior of cylinder 41, whereby hydraulic fluid under pressure so introduced will cause the cylinder 41 to raise. Then, of course, upon outward flow of the hydraulic fluid through the line 61, the cylinder 41 will lower.

Referring now to FIG. 1, it will be seen that the hydraulic fluid system is so arranged that the fluid is supplied simultaneously to the forward pair 17 of jacks 15 from a suitable source of hydraulic fluid, which is controlled by suitable means, and which source and control is indicated diagrammatically as at 65. The line 67, which leads from the fluid source and control 65, branches and leads into the inlet lines 61 of the forward pair 17 of jacks. By the same token, the line 69 leads from the fluid source and control 65 to the rearward pair 19 of jacks through the inlet lines 61 thereof. The flow of fluid through lines 67 and 69 is preferably independently controlled by a suitable pair of valves, not shown, which are a part of the control and fluid source system shown diagrammatically as at 65, and well-known to those skilled in the art. All of the lines 61, 67 and 69 are adjacent supporting surface 25, or, if desired, the lines 67 and 69 may be overhanging and brought in from the tops of the casings 21 from where the lines extend downwardly along the insides of the casings to the inlet connections at the lower ends of the plungers 39. At any rate, the lines 61, 67 and 69 are stationary, as opposed to prior types of lifts in which the lines were movable and there was the danger of a line being broken.

Vehicle supporting carriage 13 includes a first or forward transverse member 71 pivotally supported adjacent the opposite ends thereof from forward pair 17 of jacks 15, and a rearward transverse member 73 pivotally supported adjacent the opposite ends thereof from rearward pair 19 of jacks 15. The constructions of transverse members 71, 73 are substantially identical, as well as the relationship with their associated jacks, so that the following description of forward transverse member 71 and its relationship with forward pair 17 of jacks 15 should suffice for both:

Forward transverse member 71 includes, at the opposite ends thereof, bifurcated end portions 75 that respectively embrace the forward pair of jacks and are pivotally connected thereto as by means of the pins 77 fixedly attached on opposite sides of cylinder 41 adjacent the lower end thereof and extending outwardly therefrom in opposite directions, and which are pivotally engaged in sockets 79 in end portions 75. The main or middle portion 81 of transverse member 71 extends substantially horizontally and is rigidly connected adjacent the opposite ends thereof to the respective end portions 75 by the upwardly angling portions 83. By this hereinabove mentioned construction, it will be seen that the middle portion 81 is offset downwardly from the bifurcated end portions 75, as best seen in FIG. 4. In cross-section, the middle portion 81 and angled portions 83 are substantially in the shape of an inverted U, as best seen in FIGS. 7 and 8.

The means for equalizing the forward pair 17 of jacks 15 and the means for equalizing the rearward pair 19 of jacks 15 are substantially identical, and the following description of the equalizing mechanism 85 and its relationship to the forward pair 17 of jacks 15 will suffice for both:

Equalizing mechanism 85 includes a pair of pulleys 87, 89 that are side-by-side, as best seen in FIGS. 7 and 11, and are rotatably supported on a pin 91 in the interior of upwardly angled portion 83. Another pair of pulleys 93, 95 are similarly rotatably supported in the other upwardly angled portion 83 at the other end of transverse member 71. A first cable 97 is anchored by suitable means, as best seen in FIGS. 4, 9 and 10, to base plate 23. This means of attachment comprises an enlarged portion 99 fixedly mounted on the end of first cable 97 and which enlarged portion fits into an aperture 101 provided in base plate 23. Additionally, a bracket 103 fits over enlarged portion 99 with the cable 97 extending through a slot 105 in the bracket and with the bracket being fixedly attached to the base plate 23 as by means of the bolts 107. First cable 97 extends upwardly from the heretofore described attachment means and then over pulley 89. From there, first cable 97 extends under pulley 95 and around the pulley from where it extends upwardly to an anchoring place, indicated generally as at 109, where the upper end of first cable 97 is fixedly attached to the interior of a casing 21. (The opposite one of the casings 21 of the forward pair from the one in which the lower end of cable 97 is anchored.) The means of anchoring the upper end of the cable is by any suitable means, as, for example, like the bracket 111 and the threaded sleeve and nut assembly 113, best seen in FIG. 4, which, although it is actually the anchoring for another cable, illustrates a suitable anchoring means. Equalizing mechanism 85 also includes a second cable 115 similar to first cable 97, except that second cable 115 is anchored to the base plate 23 of the other jack 15 of the forward pair 17 from that to which the first cable 97 is anchored, and the second cable is anchored to the other of the casings 21 from that to which first cable 97 is anchored. The second cable 115 extends from its place of attachment to base plate 23 over pulley 93, under pulley 87 and thence to its place of anchoring on the casing 21. From the foregoing it will be understood that the forward pair 17 of jacks 15 will raise and lower together, and in a similar manner the rearward pair 19 of jacks 15 will raise and lower together, although not necessarily in synchronization with the forward pair 17.

Vehicle supporting carriage 13 additionally includes a pair of transversely spaced longitudinal members 117, 119 extending between transverse members 71, 73 and pivotally attached thereto. Longitudinal members 117, 119 are preferably of I-beam construction, as best seen in FIGS. 12 and 13, and are pivotally attached to the transverse members 71, 73 by suitable means, as, for example, each of the pivot connections preferably includes a pair of spaced lugs 121 fixedly attached to the member 71 or 73. Each pair of lugs 121 extend on opposite sides of the web of the respective longitudinal member 117 or 119 (see FIG. 3) with a pin 123 extending through aligned apertures in the lugs 121 and the web of the members 117, 119. Thus, it will be understood that the pivotal connection between the longitudinal members 117, 119 and the transverse members 71, 73 permits relative pivoting movement about substantially horizontal axes. Thus, regardless of the comparative height of the forward pair 17 of jacks 15 and the rearward pair 19 of jacks 15, there is no binding of the vehicle supporting carriage 13.

Rear wheel supporting structure 125 is supported adjacent the opposite ends thereof from longitudinal members 117, 119 in a fixed position adjacent rearward transverse member 73, as best seen in FIGS. 1 and 2. Rear wheel supporting structure 125 preferably comprises a pair of parallel spaced transverse beams 127 that are preferably channel-shaped in cross-section and have their adjacent ends fixedly attached together by means of the plates 129 welded thereto (FIG. 12) which, in turn, are fixedly attached to the webs of longitudinal members 117, 119 as by means of the bolt and nut assemblies 131 extending through aligned apertures therein. The upper flanges of beams 127 are preferably cut out as at 133 and extend above the longitudinal members 117, 119. In addition, rear wheel supporting structure 125 includes a pair of dished plates 135 for respectively receiving the two rear wheels of a vehicle, not shown, which is supported by the vehicle lift 11. The dished plates 135 are transversely spaced apart and are respectively fixedly attached to the beams 127. Each of the dished plates 135 includes a forwardly and horizontally extending forward lip 137 that is spaced above the forward one of beams 127, as best seen in FIGS. 2 and 14, for a purpose later to be described. In addition, transversely elongated piece 139 is provided between lip 137 and beam 127 and spaced rearwardly from the leading edges of the lip 137 and beam 127, as best seen in FIG. 14, to provide a stop and to define with the lip and the beam a notch 141.

A front wheel supporting structure 143 extends between longitudinal members 117, 119 and is movably supported therefrom for movement between a rearward position adjacent rear wheel supporting structure 125, as seen in FIG. 14, and a forward position spaced forwardly from the rear wheel supporting structure, as seen in FIGS. 1 and 2. Front wheel supporting structure 143 includes a pair of transverse beams 145 which are preferably channel-shaped in section, as best seen in FIG. 2. Beams 145 are in spaced parallel relationship and are rigidly interconnected by a pair of dished plates 147 that are fixedly attached to the beams 145, as by welding or the like. Dished plates 147 are transversely spaced to receive the front wheels of a vehicle, and each includes a rearwardly and horizontally extending rearward lip 149 which projects rearwardly beyond the rearward one of beams 145 and is at a height to be received in notch 141. In other words, the relationship of forward lip 137 and rearward lip 149 is such that the forward lip is at a slightly higher level than the rearward lip so that the forward lip is adapted to extend closely over the rearward lip in overlapping relationship thereto when the front wheel supporting structure 143 is in said rearward position, as best seen in FIG. 14. Front wheel supporting structure 143 additionally includes a pair of rollers 151 respectively rotatably supported from axles 153 attached to the beams 145 at one of the ends thereof so that the rollers 151 are in position to engage the lower inside flange of longitudinal member 117, as best seen in FIG. 13, to rollingly support one end of the front wheel supporting structure 143. Similarly, at the opposite end of the front wheel supporting structure 143, a pair of rollers 155 are provided to engage the inner lower flange of longitudinal member 119 to rollingly support the other end of the front wheel supporting structure 143. It will be noted that the forward portions of the dished plates 147 are turned upwardly as at 157 for a purpose later to be described, and also it will be noted that the upper flanges of beams 145 are at a higher level than the longitudinal members 117, 119, as best seen in FIG. 13.

A pair of combined ramp and chock mechanisms 159 are provided, as best seen in FIGS. 1 and 2. The ramp and chock mechanisms 159 are spaced apart and arranged to receive the respective left and right wheels of a vehicle. The ramp and chock mechanisms 159 are substantially identical, and the following description of one will suffice for both:

Mechanism 159 comprises a wheel supporting plate 161 which is pivotally mounted intermediate the ends thereof for pivot about a substantially horizontal and transverse axis by means of a hinge 163 that pivotally connects the plate 161 from rearward transverse member 73 adjacent the upper rearward edge thereof, as best seen in FIG. 2. Plate 161 is arranged to pivot between a first position, shown in solid lines in FIG. 2, and a second position, shown in broken lines in FIG. 2. Plate 161 extends forwardly of hinge 163 to provide a forward portion 165 having a forward edge 167, and plate 161 extends rearwardly of the hinge to provide a rearward ramp portion 169 having a rearward edge 171. Thus, forward portion 165 and rearward ramp portion 169 are integrally and rigidly joined for conjoint movement. Rearward portion 169 is heavier than forward portion 165 so that when the vehicle supporting carriage 13 is raised, as shown in FIG. 2, and the plate 161 is unrestrained, the plate will pivot from said second position, shown in broken lines, towards said first position, shown in solid lines, under the influence of gravity. The plate 161 will be stopped in said first position by suitable stop means 172 which is preferably incorporated in hinge 163 in a manner well-known to those skilled in the art. When plate 161 is in said first position, forward portion 165 is angled forwardly and upwardly from transverse member 73 with the forward edge 167 thereof being spaced above the transverse member in a position to engage a rear wheel of a vehicle on the vehicle lift 11 to limit rearward movement thereof. It will be understood that the rearward edge 171 of the ramp portion 169 is in a position to engage the supporting surface 25 when the vehicle supporting carriage 13 is lowered, which will cause pivot of plate 161 to said second position, shown in broken lines in FIG. 2, in which position the forward portion 161 is contiguous with rearward transverse member 73 and substantially horizontal for allowing movement of the vehicle wheel thereover. It will further be understood that when the vehicle supporting carriage 13 is lowered, the lower flanges of longitudinal members 117, 119 will preferably be resting on the supporting surface 25. Thus, the rearward edge 171 is positioned so that it is substantially level with the lower flange of the longitudinal members 117, 119 when the forward portion 165 is contiguous with or lying against the upper surface of the rearward transverse member 73.

It is thought that the operation of the vehicle lift 11 will be apparent from the foregoing description; however, for a more complete description, the following operation is given. With the vehicle supporting carriage 13 lowered to the supporting surface 25, and with the front wheel supporting structure 143 in a rearward position adjacent rear wheel supporting structure 125, as seen in FIG. 14, the vehicle is driven forwardly over the ramp and chock mechanisms 159 until the forward wheels of the vehicle pass over the rear wheel supporting structure 125 and into the front wheel supporting structure 143. Continued movement of the vehicle will cause the front wheel supporting structure to move forwardly until the rear wheels of the vehicle are in the rear wheel supporting structure 125, whereupon the vehicle is stopped and the vehicle lift 11 raised to a desired height for gaining access to the undercarriage of the vehicle. When it is desired to remove the vehicle from the vehicle lift 11, substantailly the reverse of the above-described operations takes place. It will be understood that the overlapping arrangement of the lips 137, 149, as best seen in FIG. 14, will prevent any accidental displacement of the front wheel supporting structure 143 while the vehicle is moving into and out of place on the vehicle lift 11.

Referring now to FIGS. 15, 16 and 17, there is shown therein a modification of the connection between longitudinal member 119 and transverse member 71, which may be used, if desired, at each of the connections between longitudinal members 117, 119 and transverse members 71, 73 in place of the pair of lugs 121 and pin 123. In this modified construction shown in these three figures, a member 173 of substantially U-shaped cross-section is fixedly attached to member 119 on the upper surface thereof as by welding or the like. Member 173 extends beyond the end of the longitudinal member 119 and rests on top of transverse member 71. A vertical pin 175 is fixedly attached, as by welding or the like, to the web of transverse member 71 in an aperture 177 therein. Pin 175 extends upwardly through an elongated aperture 179 provided through member 173. Aperture 179 is elongated in a fore and aft direction relative to vehicle lift 11, i.e. parallel to the longitudinal axis of longitudinal member 119, so that member 119 can move or pivot relative to transverse member 71. A washer 181 is loosely received over pin 175 on top of member 173, and a cotter pin 183 is provided through pin 175 over the washer to prevent accidental removal of member 173 from pin 175, but which permits the above-mentioned movement of longitudinal member 119 relative to transverse member 71. Thus, no binding can occur in the vehicle supporting carriage 13.

From the foregoing description, it will be understood that the vehicle lift of the present invention provides a very efficient, economical and safe vehicle lift in which many of the previous problems of lifts of this general type have been overcome. Thus, due to the unique arrangement of the present lift, there is no binding of the vehicle supporting carriage, and there is provided a more compact overall structure.

Although the invention has been described in some detail by way of illustration and example for purposes of clarity or understanding, it is to be understood that it is not to be so limited since changes and modifications may be made therein which are within the full intended scope of this invention as hereinafter claimed.

I claim:
1. A vehicle lift supported from a supporting structure, said vehicle lift comprising a first pair of spaced upstanding hydraulic jack means movable between retracted positions and extended positions, a second pair of spaced upstanding hydraulic jack means spaced from said first pair of hydraulic jack means and movable between retracted positions and extended positions, a first transverse member supported adjacent the opposite ends thereof from said first pair of jack means, a second transverse member supported adjacent the opposite ends thereof from said second pair of jack means, a pair of spaced longitudinal members extending between said first transverse member and said second transverse member, pivot means respectively pivotally attaching the opposite ends of said longitudinal members to said transverse members, rear wheel supporting structure mounted on said pair of longitudinal members adjacent said second transverse member, a front wheel supporting structure movably mounted on said pair of longitudinal members for movement from a position adjacent said rear wheel supporting structure to a position adjacent said first transverse member; and hydraulic means connected to said jack means for the raising and lowering thereof to carry said transverse members, said longitudinal members, and said front and rear wheel supporting structures therewith for the raising and lowering of the vehicle, said front wheel supporting structure including a dished plate for receiving the front wheel of the vehicle, said dished plate of said front wheel supporting structure including a rearwardly and horizontally extending rearward lip, said rear wheel supporting structure including a dished plate for receiving the rear wheel of a vehicle, said dished plate of said rear wheel supporting structure including a forwardly and horizontally extending forward lip, said forward lip being at a slightly higher level than said rearward lip whereby said forward lip is adapted to extend closely over said rearward lip in overlapping relationship thereto when said front wheel supporting structure is in said position adjacent said rear wheel supporting structure.

2. A vehicle lift supported from a supporting structure, said vehicle lift comprising a carriage, means attached to said carriage for the raising and lowering thereof, said carriage including a pair of spaced longitudinal members, rear wheel supporting structure mounted on said longitudinal members, a front wheel supporting structure movably mounted on said pair of longitudinal members for movement from a position adjacent said rear wheel supporting structure to a position spaced therefrom, said front wheel supporting structure including a dished plate for receiving the front wheel of a vehicle, said dished plate of said front wheel supporting structure including a rearwardly and horizontally extending rearward lip, said rear wheel supporting structure including a dished plate for receiving the rear wheel of a vehicle, said dished plate of said rear wheel supporting structure including a forwardly and horizontally extending forward lip, said forward lip being at a slightly higher level than said rearward lip whereby said forward lip is adapted to extend closely over said rearward lip in overlapping relationship thereto when said front wheel supporting structure is in said position adjacent said rear wheel supporting structure.

References Cited

UNITED STATES PATENTS

| | | | |
|---|---|---|---|
| Re. 25,923 | 12/1965 | Powell | 187—8.59 X |
| 1,525,447 | 2/1925 | Hose. | |
| 1,710,442 | 4/1929 | Warshaw. | |
| 1,963,022 | 6/1934 | Kettelson | 187—8.59 |
| 2,124,726 | 7/1938 | Blum | 187—8.59 |
| 2,262,833 | 11/1941 | Clawson et al. | 187—8.59 |
| 2,661,816 | 12/1953 | Hulsart | 187—8.41 |
| 3,182,009 | 5/1965 | Nalband et al. | 187—8.59 X |

FOREIGN PATENTS

| | | |
|---|---|---|
| 164,337 | 7/1955 | Australia. |
| 1,076,265 | 4/1954 | France. |
| 724,511 | 2/1955 | Great Britain. |
| 370,896 | 9/1963 | Switzerland. |

SAMUEL F. COLEMAN, *Primary Examiner.*